US005117482A

United States Patent [19]

Hauber

[11] Patent Number: 5,117,482

[45] Date of Patent: May 26, 1992

[54] IMPROVED POROUS CERAMIC BODY ELECTRICAL RESISTANCE FLUID HEATER

[75] Inventor: David E. Hauber, Troy, N.Y.

[73] Assignee: Automated Dynamics Corporation, Troy, N.Y.

[21] Appl. No.: 465,372

[22] Filed: Jan. 16, 1990

[51] Int. Cl.[5] .......................... H04B 3/12; F24H 1/10

[52] U.S. Cl. .................................... 392/492; 239/135; 392/379; 392/383; 392/397; 392/473; 392/485; 392/502

[58] Field of Search ............... 392/396, 397, 485, 486, 392/488, 492, 379, 383, 473-477, 491, 502; 239/133, 135

[56] References Cited

U.S. PATENT DOCUMENTS

| | | | |
|---|---|---|---|
| 1,157,293 | 10/1915 | Brockbank | 392/486 X |
| 1,880,306 | 10/1932 | Wulff | 392/307 X |
| 3,016,693 | 1/1962 | Jack et al. | 392/492 X |
| 3,270,182 | 8/1966 | Hynes | 392/492 |
| 3,688,083 | 8/1972 | Rice et al. | 392/488 |
| 3,691,346 | 7/1970 | Dyre et al. | 219/374 |
| 3,826,895 | 5/1973 | Schladitz | 219/382 |
| 3,828,161 | 8/1974 | Yamaguchi | 392/485 |
| 3,833,791 | 9/1974 | Schladitz | 392/485 |
| 3,943,330 | 3/1976 | Pollock et al. | 219/381 |
| 3,998,738 | 12/1976 | Kusay | 392/396 X |
| 4,220,846 | 9/1980 | Rice et al. | 219/381 |
| 4,544,828 | 8/1983 | Shigenobe et al. | 219/216 |
| 4,725,715 | 2/1988 | Saltinier et al. | 219/367 |
| 4,982,068 | 1/1991 | Pollock et al. | 392/488 |

FOREIGN PATENT DOCUMENTS

| | | | |
|---|---|---|---|
| 687558 | 3/1965 | Italy | 392/492 |
| 1008587 | 3/1983 | U.S.S.R. | 392/485 |

*Primary Examiner*—Anthony Bartis
*Attorney, Agent, or Firm*—Heslin & Rothenberg

[57] ABSTRACT

A fluid heater utilizing a porous ceramic, for example silicon carbide, electrically conductive body as an electrically energized heating element to heat a fluid passing through the pores thereof is provided. A plurality of interconnected annular fluid flow passageways are positioned in the fluid heater so that fluid exiting therefrom surrounds the porous body, further improving the efficiency of the porous fluid heater body. An electrical disc rear contactor is positioned within one end of the cylindrical sleeve to peripherally engage the sleeve and axially electrically engage the body. An electrically conductive disc front contactor is positioned concentrically at an opposite end of the sleeve to peripherally engage the housing in electrical contact relationship and axially engage the body in electrical contact relationship. The front disc contactor closes the front end of the annular flow path between the insulating sleeve and the porous body, and has a central channel therein to provide a fluid flow passage from the central channel of the porous body through the front disc contactor and outwardly of the end of the hollow housing.

8 Claims, 4 Drawing Sheets

IMPROVED POROUS CERAMIC BODY ELECTRICAL RESISTANCE FLUID HEATER

BACKGROUND OF THE INVENTION

This invention relates to an improved porous body fluid heater and, more particularly, to a porous ceramic body utilized as an electrical heating element to raise the temperature of a fluid passing through the pore structure of the body.

Porous bodies or structures have been employed as electrical resistance heaters for fluids, particularly gases, which pass through the pores of the body or structure. A porous heater body or structure having random profuse pores and intertwining passages therethrough provides a highly efficient means of imparting heating to a fluid passing through the body. Porous bodies have traditionally been formed of granular materials such as carbon, and filamentary materials such as a compressed or felted mass of metal coated or otherwise electrically conductive fibers. Ordinarily these porous bodies have temperature limitations when used as electrical resistance heater elements and are, or may be, excessively reactive to certain reactive fluids passing therethrough. Porous ceramics have been proposed where inertness is a criteria. Ordinarily, ceramics are electrically non-conducting and require extensive modification for use in an electrical resistance heating circuit, whereas a high temperature porous material with a positive temperature coefficient of electrical resistivity is most desired in an electrical resistance heater. Additionally, ceramic bodies are usually produced as high density low porosity structures, characteristics which are not conductive to fluid flow therein.

A porous high temperature resistant ceramic material which has a positive temperature coefficient of electrical resistivity, P.T.C., is favorably inert, and can be produced in a wide range of porosity, is a metal carbide. Metal carbides are electrically conductive composite bodies of metal carbide crystals or small particles, the porosity of which may be controlled by selection of particle size for sintering, addition of filler materials and use of metal foaming processes. Examples of such metal carbides are the refractory metal carbides of such metals as tungsten, W, zirconium, Zr, and molybdenum, Mo.

A highly desirable ceramic for this invention is one which is electrically conductive with a positive temperature coefficient of resistivity, high temperature resistant, chemically inert, and has low density and high thermal conductivity. One example of such a desirable porous ceramic material for this invention is silicon carbide, SiC, which is intrinsically electrically conducting, i.e. without reliance on added materials for electrical conductivity, and embodies the other noted attributes. Silicon carbide can be produced by fusing sand and coke at a temperature above about 4000° F. to form large crystals of silicon carbide which are then crushed to provide smaller grains primarily for extensive use as an abrasive, in the range from 100-1000 mesh. However, silicon carbide finds other uses such as high temperature semiconductors and cathodes, and will withstand high temperatures to its decomposition temperature of about 4200° F. Silicon carbide may be produced as self-bonded low density and high density silicon carbide foams. Low density silicon carbide foam has a density of about 17 lbs/ft.$^3$ with a 90% porosity, and high density silicon carbide foam has a density of about 33 lbs./ft.$^3$ with 80% porosity. Also, various additive metals in small particle form may be added to a mass of silicon carbide crystals to increase crystal to crystal bonding or modify the electrical characteristics of all or a part of the sintered body. A high desirable electrical P.T.C. porous silicon carbide body may be closely matched in electrical and physical characteristics not only to its function of being utilized as an electrical heater for a fluid passing therethough, but also matched to specific fluids. Silicon carbide has been found to be desirably inert to various hot chemical process fluids which are reactive to other porous body materials when rapidly heated to high temperatures while in contact with the porous body material. A preferred silicon carbide body of commensurate strength and electrical conductivity has a porosity in the range of from about 30% to about 50%.

Other metal carbide bodies of satisfactory porosity, inertness and electrical conductivity which may be gainfully employed in this invention include the refractory metal carbides including, for example, tungsten, W, titanium, Ti, and tantalum, Ta.

OBJECTS OF THE INVENTION

Accordingly, it is an object of this invention to provide an improved porous electrically conductive ceramic heating element adapted to heat a fluid passing through the porosity thereof.

It is another object of this invention to provide a porous refractory metal carbide element with an electrical positive temperature coefficient of electrical resistivity as an electrical resistance heater element to raise the temperature of a fluid passing through the porosity of the element.

It is yet another object of this invention to provide a hot gas torch device which utilizes a porous silicon carbide body as an electrical heater for gases passing through the porosity of the body.

SUMMARY OF THE INVENTION

The invention provides a fluid heater which utilizes a porous electrically conductive body as a heating element energized by an electrical current. The heater comprises a hollow electrically conductive housing and an electrically insulating sleeve positioned coaxially within the housing to define an annular space therebetween. An electrically conductive porous ceramic body is positioned concentrically within the sleeve to define an annular fluid flow path, and fluid flow means are used to introduce a fluid into the flow path to radially inwardly penetrate through the porous network of the porous ceramic body. The heater also comprises an electrical disc rear contactor positioned within one end of the sleeve to peripherally engage the sleeve and axially electrically engage the body, while an electrically conductive disc front contactor is positioned concentrically at an opposite end of the sleeve to peripherally engage the housing in electrical contact relationship and axially engage the body in electrical contact relationship. The front disc contactor closes the front end of the annular flow path between the insulating sleeve and the porous body, and has a central channel therein to provide a fluid flow passage from the central channel of the porous body through the front disc contactor and outwardly of the end of the hollow housing. The heater further comprises an electrically conducting fluid conduit positioned coaxially in the housing to have an end thereof adjacent to the rear electrical contactor; a fluid nozzle at the end of the fluid conduit in fluid flow relationship therewith with the nozzle and engaging the rear disc contactor in electrical contact relationship; the rear disc contactor having axial grooves in its periphery engaging the sleeve to provide a fluid flow passage from the nozzle into the annular fluid flow path so that fluid from the conduit and the nozzle may flow into the annular fluid flow path and radially inwardly penetrate the pore structure of the hollow body to exit axially therefrom; and electrical connection means on the housing and the electrically conductive fluid conduit to connect the housing and the conduit to an electrical circuit for electrically energizing the body to generate heat for heating the body and the fluid penetrating its pore structure.

DESCRIPTION OF PREFERRED EMBODIMENTS

Figure 1:
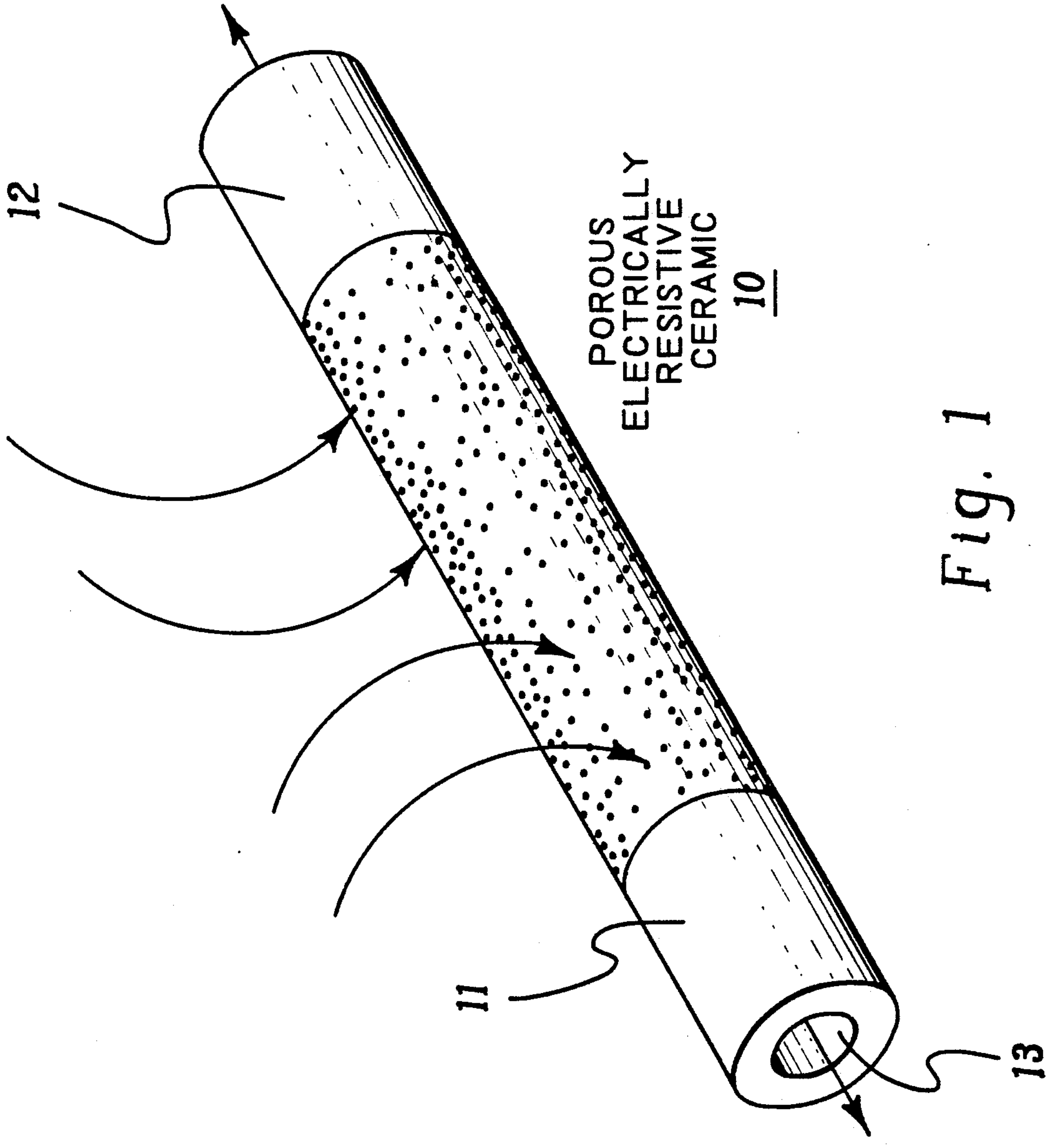
FIG. 1 is schematic illustration of one preferred electrically conductive porous ceramic fluid heater element.

Referring now to FIG. 1, a porous ceramic heating element of this invention comprises a hollow cylindrical body 10 of a porous ceramic material, for example, a metal carbide as described, i.e. a self-bonded low density high porosity ceramic such as a silicon carbide which is electrically conductive with P.T.C. characteristics. Other non-carbide materials, for example, molybdenum disilicide or titanium diboride, may alternatively be used depending upon the application. Electrical connection for body 10 may be provided by means of electrically conductive metal members suitably attached to opposite ends of body 10. However, the good electrical conducting characteristics of a sintered silicon carbide body permit electrical connection directly to body 10, and such connection may be facilitated by having sections of body 10 of reduced porosity and electrical resistance such as opposite disc sections 11 and 12 of FIG. 1 which may be integral with body 10 and formed therewith in the manufacturing process. The noted sections 11 and 12 or other electrical connection means may also take the form of a metal coating on body 10, or represent sections of body 10 having additional electrical conductive material incorporated therein.

When body 10 is connected into an appropriate electrical circuit in series relationship, the silicon carbide structure becomes heated by electrical resistance heating to impart a high temperature to any fluid passing through the pore structure therein. The pore structure in a ceramic body of sintered silicon carbide may be described as a random tortuous intertwined network of openings and passageways which subjects any fluid passing therein to a large area of heated surface and increased transit time for rapid and efficient heat transfer to the fluid contained therein. Various configurations for body 10 may be gainfully employed as a heater element. It suffices that the body include means (for example, electrical energization), to raise its temperature throughout its porous network and that it be positioned in a fluid flow duct so that the fluid must flow through the porous network structure to pass by the body. Such a description applies equally well to other configurations such as discs and rectangular sided bodies, slabs and plates in a fluid flow path.

The hollow cylindrical body 10 of FIG. 1 is a highly desirable heater configuration by providing a very large circumferential area and porous network structure for radially inward fluid penetration, and convenient central channel 13 for fluid collection and further distribution.

As illustrated by the flow arrows in FIG. 1 a fluid to be heated is brought into contact with the external surface of a heated body 10 by appropriate fluid flow means to pass radially inwardly though the described pore network of body 10 and exit into the central channel 13 of body 10. Impetus for the flow is provided by means of a fluid pressure differential between the external region of body 10 and its central channel 13. After penetrating the porous network of heated body 10, and becoming heated thereby, the heated fluid may be withdrawn from channel 13 at one or both ends of body 10.

Body 10 represents a convenient structure for heating a fluid such as a gas by passing the gas through the porous network of the ceramic body while the body is connected into an electrical circuit as an electrical resistance heater. The heater body 10 of this invention is most advantageously utilized when the body is exposed to fluid flow in such a manner that the fluid must flow through the pore network of the body as the only convenient passage for fluid flow through a device in which body 10 is mounted or positioned. One basic device which is particularly adaptable for use of a body 10 is schematically illustrated in FIG. 2.

Figure 2:
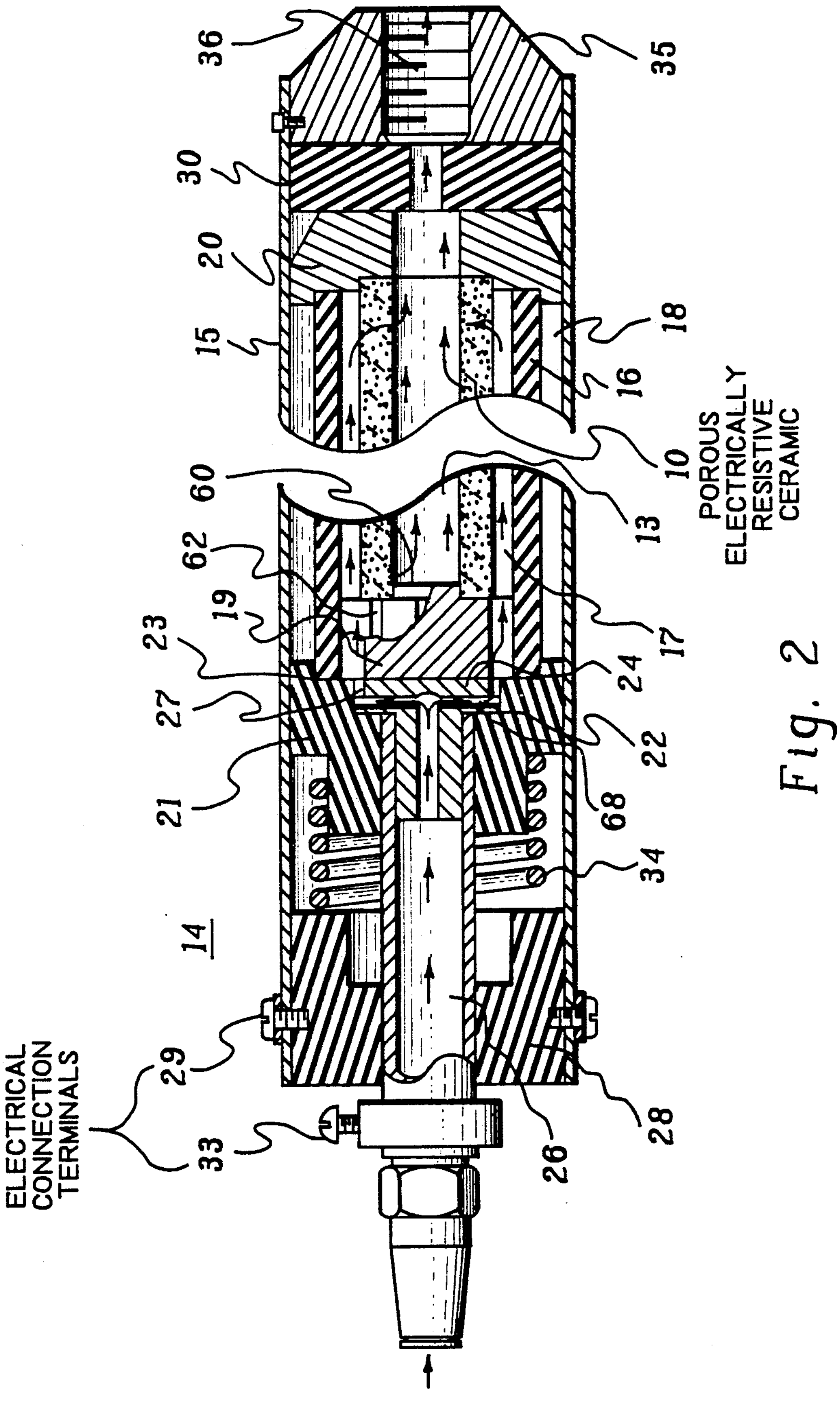
FIG. 2 is a schematic illustration of a fluid heater of this invention utilizing the element of FIG. 1.

Referring now to FIG. 2, fluid heater 14 comprises an outer hollow cylindrical casing 15 (also referred to as a housing) in which a body 10 is concentrically positioned. A cylindrical sleeve 16 of an electrically nonconductive material is concentrically positioned in housing 15 to surround and be spaced from body 10 as well as spaced from housing 15. Sleeve 16 defines inner and outer annular plenum or flow path spaces 17 and 18, respectively. Disc contactors 19 and 20 at each end of body 10 are utilized to provide electrical contact to body 10.

As illustrated in FIG. 2, insulating cylinder 16 extends axially a greater distance than body 10 to provide an overlap space, and rear contactor 19 fits concentrically in the end of cylinder 16 in the defined overlap space to axially abut or engage the end of body 10 in electrical contact relationship. Front and rear contactors 20 and 19, respectively, are preferably of a high temperature resistant and good electrically conductive material such as carbon, silicon carbon or other conductive material. Rear contactor member 19 includes a small concentric projection 60 which fits into channel 13 of body 10 for mechanical support purposes a well as for an increase in contact area of rear contactor 19 with body 10. An annular support block 21 of a high temperature electrically insulating material such as aluminum oxide $Al_2O_3$ or magnesium oxide, MgO, is concentrically positioned in housing 15 next adjacent rear contactor member 19 to axially engage contactor 19 and the overlap end of cylinder 16. Support block 21 includes inner and outer concentric counterbore recesses 22 and 23 therein. Outer recess 23 receives concentrically therein the overlap end of sleeve 16 in supporting relationship. Inner recess 22 is next adjacent rear contactor member 19 in concentric relationship and contains fluid flow inlet means in the form of an electrically conductive distributor or nozzle 24 therein. Nozzle 24 may be described as a hex head bolt with a hollow shank which extends coaxially through block 21 to be joined in a fluid flow relationship to an electrically conductive fluid entry conduit 26 to supply a fluid such as a gas to nozzle 24. The head of nozzle 24 contains a circumferential row of equally spaced radially directed fluid passages 68 which open into the hollow cylindrical shank part of nozzle 24 to be in fluid flow communication with fluid conduit 26.

The head part of nozzle 24 is radially spaced from the periphery of counterbore recess 22 in support block 21 to define an annular flow path passage 27, and the periphery of rear contactor 19 contains a plurality of circumferentially spaced axial grooves 62 which define a passage or passages between annular flow path space 17 and annular passage 27. A fluid, for example, a gas, to be processed or heated by heater 14 of this invention, is introduced through combined electrode and fluid conduit 26 which is concentrically supported in housing 15 by an electrically insulating- cylindrical end block 28 fitting concentrically in housing 15 and retained therein by suitable securing means such as set screws 29 threaded radially inwardly through housing 15 into block 28. At the end of housing 15 of heater 14 remote from nozzle 24, an electrically insulating supporting flow member 30 is positioned concentrically in housing 15. Supporting flow member 30 may be subjected to very high temperatures and is thus formed from a very high temperature resistant material such as boron nitride. Front electrical connector member 20 in the form of an annular electrically conducting ring is positioned to bear against support flow member 30 on one side, and against the end of body 10 on the other side. Front electrical contactor member 20 also peripherally engages housing 15 in electrical contact relationship. Electrical power is connected to heater 14 though conduit 26 by means of an electrical screw connector 33 thereon. Conduit 26 is electrically connected to electrically conductive nozzle 24, the head of which bears against rear contactor 19 and provides the electrical connection to body 10, at one end thereof. At the other end of body 10 electrical contactor 20, which could be SiC or other conductive material, is in electrical contact with an end of body 10 and peripherally with housing 15 so that housing 15 is a part of the electrical flow circuit. One of the set screws 29 for end block 28 facilitates connection of an electrical conductor to housing 15. Accordingly, an electrical flow path is established from connector 33 and conduit 26 to nozzle 24 to contactor 19 through body 10 and contactor 20 to housing 15.

In order to maintain good electrical connection, a highly electrically conductive paste such as graphite paste may be utilized between contactors 20 and 19 and body 10, between contactor 20, and housing 15, and between nozzle 24 and contactor 19.

Electrical contact is further assured and maintained by means of a helical coil spring 34 which is positioned concentrically in housing 15 to have one end bearing against block 21 and the other end against electrically insulating cylindrical end piece 28 which is concentrically retained in housing 15 by means of set screws 29. Appropriate dimensioning of engaging parts may provide additional constant force on contactor 19 against body 10. Spring 34 allows for the thermal expansion of heating element 10 which is free is slide inside of sleeve 16. This movement is accommodated through the movement of support block 21 which is free to slide inside housing 15.

A process fluid such as a gas to be heated passes, as described, from conduit 26 into annular, flow space 17 around body 10. Electrical power into body 10 as described causes electrical resistance heating of body 10. Because of the pressure differential in the fluid flow path, the fluid or gas in space 17 flows into the porous network structure of body 10 as described with respect to FIG. 1 and enters channel 13 to flow out of heater 14 through exit nozzle 35. Exit nozzle 35 includes a central bore 36 which is appropriately threaded for connection of heater 14 to additional fluid flow apparatus.

Because of the rapid and efficient temperature rise of body 10, significant heating of housing 15 may be encountered. However, significant cooling of housing 15 may be achieved and the efficiency of heater 14 further increased by the use of a modified fluid flow path and labrynth seal arrangement as shown in FIG. 3.

Figure 3:
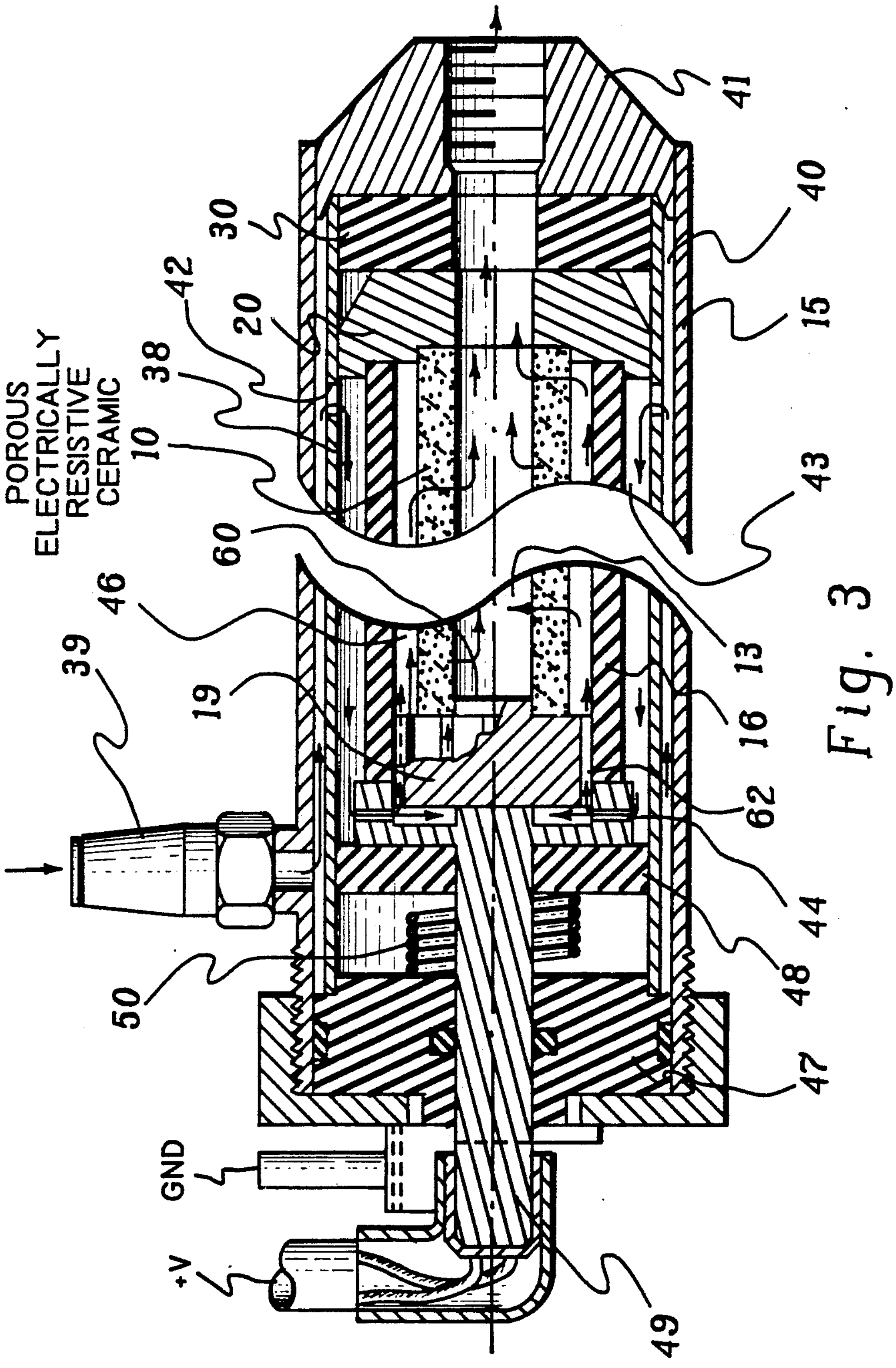
FIG. 3 is a schematic illustration of a preheater modification of the invention of FIG. 2.

Referring now to FIG. 3, heater 37 is generally similar in construction to heater 14 of FIG. 2. Heater 37 differs from heater 14 particularly in the use of an additional concentric metal sleeve 38 positioned concentrically in outer hollow cylindrical casing 15 (also referred to as a housing) to surround both insulator cylinder 16 and body 10. Sleeve 38 defines a modified fluid flow path which serves to cool housing 15 while preheating the heater fluid for better heater efficiency. The modified flow path includes fluid inlet means in the form of one or more entrance apertures 39 in housing 15 adjacent one end thereof. Fluid introduced through an aperture 39 flows into the outer annular flow path or labrynth 40 between sleeve 38 and housing 15 and moves towards exit nozzle 41. This flow of entering and cool fluid along housing 15 maintains housing 15 at a reduced temperature. Sleeve 38 includes a peripheral row of apertures 42 at the end thereof adjacent nozzle 41. Apertures 42 receive fluid from flow path 40 and directs the flow into annular flow path space 43 between insulating cylinder 16 and sleeve 38 to flow in counterflow relationship to the fluid flow in annular flow space 40 and along insulating cylinder 16 towards rear electrode 19. One or more radial apertures 44 are included in an electrical conductor 49 adjacent the rearward end of insulating cylinder 16. Apertures 44 receive a flow of fluid from plenum 43 to flow in grooves 62 in electrode 19 before entering annular plenum 46 between insulator sleeve 16 and body 10 in counterflow relationship to the flow in plenum 43. Fluid flow in the annular spaces or plenums 43 and 46 and particularly in plenum 46 becomes heated through proximity with hot body 10. Preheating of the fluid before it penetrates the pore network structure of body 10 as described with respect to FIG. 1, increases the heating efficiency of body 10 which then requires less energy to bring the passing fluid to a desired temperature. Electrical power is connected to heater 37 in a manner similar to that as described for FIG. 2 in that front and rear electrical contactors 19 and 20 bear against body 10 in electrical contact therewith and front contactor 20 also peripherally engages electrically conductive metal sleeve 38. An electrically insulating supporting flow member 30 is positioned concentrically in housing 15, also as described for FIG. 2.

A pair of insulating disc members 47 and 48 are positioned at the rearward end of heater 37. Member 47 serves to partially define the end of plenum 40, while member 48 defines the end of annular flow space 43. Members 47 and 48 are axially aligned and an electrical conductor 49 passes through the centers thereof. Accordingly, when electrode 49 is connected to suitable source of electrical voltage (+v), current is caused to flow from electrical conductor 49 to contactor 19 and through body 10 to electrical contactor 20 which is in electrical contact with body 10 and sleeve 38. Electrical current from contactor 20 flows through sleeve 38 to nozzle 41 and through housing 15 to the noted suitable source of electrical power to complete a basic electric circuit for heating of body 10 by electrical resistance heating. Spring 50 allows for the thermal expansion of body 10 which is free to slide inside of sleeve 16. This movement is accommodated through the movement of electrode 49 and insulating disc member 48 which is free to slide inside of sleeve 38.

A fluid, gas for example, entering heater 37 through fluid connector 39 flows through a labrynth relationship of tubular elements defining annular flow path spaces 40, 43 and 46 for preheating and then penetrates the pore network of an electrically conductive ceramic, silicon carbide for example, body 10, to become heated thereby and enter channel 13 of body 10 to then flow out of heater 37 through nozzle 41. A very effective fluid heater is thus provided which is amenable to various modifications of fluid flow and operatively associated electrical heating means so that the structure may be predetermined for a specific heating function fluid, or both.

Figure 4:
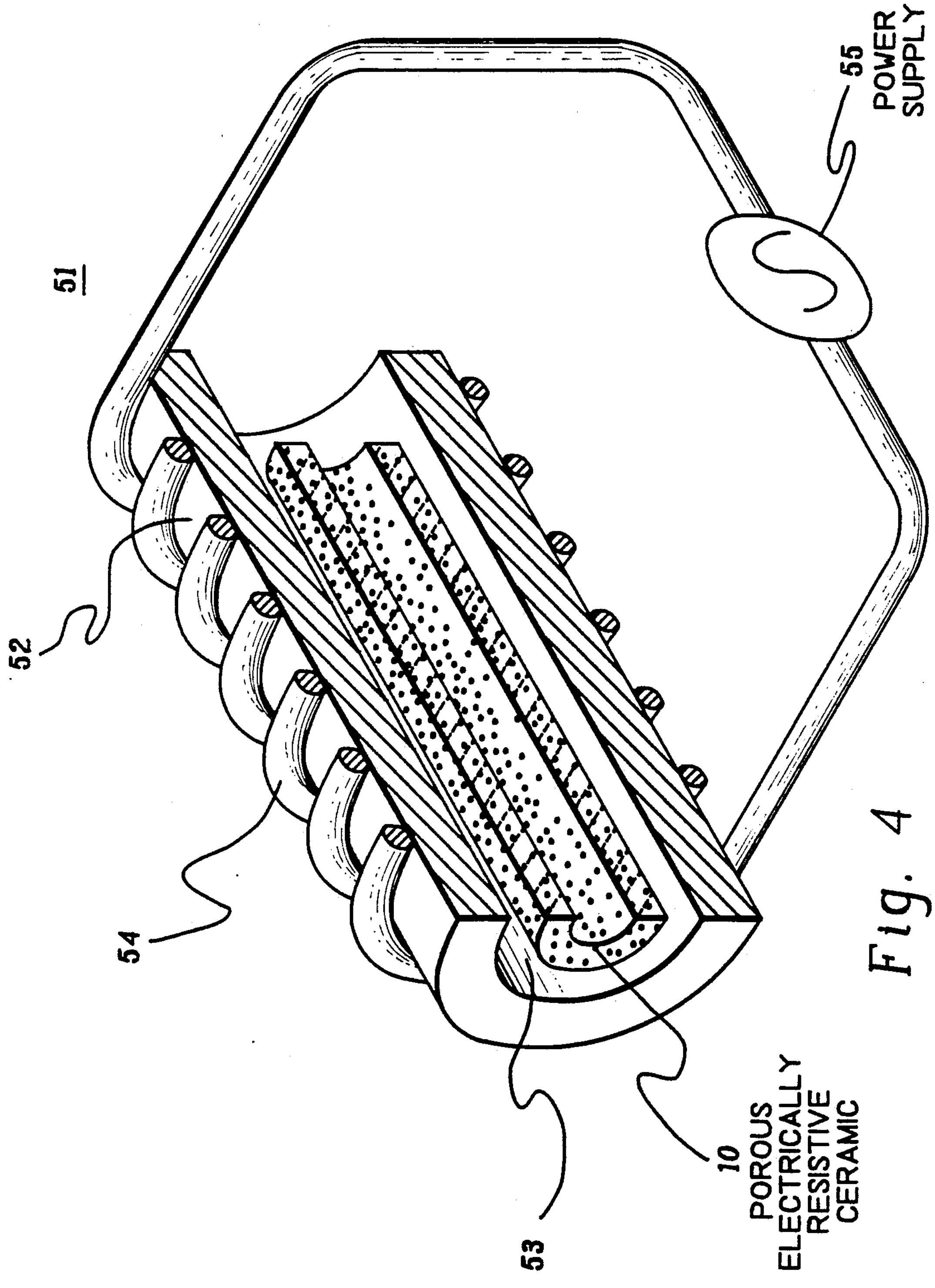
FIG. 4 is a schematic illustration of an alternate power source for the heater element of this invention.

In this connection, alternate electrical heating means may be operatively associated with body 10 as illustrated, for example, in FIG. 4.

Referring now to FIG. 4, a fluid heating system 51 comprises a body 10, as described with respect to FIG. 1, positioned concentrically within an electrically insulating sleeve or jacket 52 which defines an annular plenum space 53 with body 10. Plenum space 53 is appropriately modified to admit a fluid under moderate pressure therein in surrounding relationship to body 10 so that the fluid enters the pore network structure of body 10 as described with respect to FIG. 1 to become heated in the pore network structure and flow into channel 13 to exit the system at one end thereof. Heating of body 10 in system 51 of FIG. 4 is achieved by positioning jacket 52, with body 10 therein, within, an induction heating coil 54. Induction heating coil 54 is electrically connected to a source 55 of AC electrical power. Body 10 in FIG. 4 is heated by electromagnetic energy from coil 54 to heat the fluid flowing through its pore network structure.

This invention provides a highly efficient fluid heater in the form of a porous ceramic body with a positive temperature coefficient of electrical resistance and with a random pore and interconnected passage structure for the passage of a fluid therein. The body is positioned in a fluid flow channel and electrically energized, for example, by being connected into an electrical circuit as an electrical resistance heater or subjected to electromagnetic energy. In order for the fluid to continue to flow in the defined channel, the fluid must pass through the body through its porous network structure in which it becomes rapidly and efficiently heated by exposure to a very large heated area of the porous network. The electrical resistance of the body and its porous structure may be varied or graded along the path of electrical conductivity by variations in added electrically conductive particles in the body or by variations in the porosity thereof to avoid localized overheated regions.

While this invention has been disclosed and described with respect to preferred embodiments thereof, it will be understood by those skilled in the art that various changes and modifications may be made without departing from the spirit and scope of invention as set forth in the following claims.

What is claimed is:

1. A fluid heater utilizing a porous electrically conductive body as a heating element energized by an electrical circuit, said heater comprising in combination:

(a) a hollow electrically conductive housing;

(b) an electrically insulating sleeve positioned coaxially in said housing to define an annular space therebetween;

(c) an electrically conductive porous ceramic body positioned concentrically within said electrically insulating sleeve to define an annular fluid flow path therebetween, said body having a central channel therein;

(d) fluid flow means to introduce a fluid into said annular flow path to radially inwardly penetrate through the porous network of said porous ceramic body;

(e) an electrical disc rear contactor positioned within one end of said cylindrical sleeve to peripherally engage said sleeve and axially electrically engage said body;

(f) an electrically conductive disc front contactor positioned concentrically at an opposite end of said sleeve to peripherally engage said housing in electrical contact relationship and axially engage said body in electrical contact relationship, said front disc contactor closing the front end of said annular flow path between said insulating sleeve and said porous body, and said front disc contactor having a central channel therein to provide a fluid flow passage from said central channel of said porous body through said front disc contactor and outwardly of the end of said hollow housing;

(g) an electrically conducting fluid conduit positioned coaxially in said housing to have an end thereof adjacent said rear electrical contactor;

(h) a fluid nozzle at said end of said fluid conduit in fluid flow relationship therewith with said nozzle engaging said rear disc contactor in electrical contact relationship;

(i) said rear disc contactor having axial grooves in its periphery engaging said sleeve to provide a fluid flow passage from said nozzle into said annular fluid flow path so that fluid from said conduit and said nozzle may flow into said annular fluid flow path and radially inwardly penetrate the pore structure of said hollow body to exit axially therefrom; and (j) electrical connection means on said housing and said electrically conductive fluid conduit to connect said housing and said conduit to an electrical circuit for electrically energizing said body to generate heat for heating said body and said fluid penetrating its pore structure.

2. The fluid heater as recited in claim 1 wherein said porous ceramic body comprises an intrinsically electrically conductive ceramic body.

3. The fluid heater as recited in claim 2 wherein said body comprises a metal carbide body.

4. The fluid heater as recited in claim 3 wherein said porous body comprises an intrinsically electrically conductive crystal structure.

5. The fluid heater as recited in claim 4 wherein said porous body includes sections of increased electrical conductivity at its ends.

6. The fluid heater as recited in claim 5 wherein said porous body has a porosity in the range of from about 30.0% to about 50.0% porosity.

7. The fluid heater as recited in claim 6 wherein said porosity comprises the sole fluid passage into the said central channel of said hollow body.

8. The fluid heater as recite din claim 7 wherein said porous body comprises an electrically conductive P.T.C. porous ceramic.

* * * * *